(12) United States Patent
Meyer

(10) Patent No.: US 6,883,973 B2
(45) Date of Patent: Apr. 26, 2005

(54) LIGHT CONDUCTOR COUPLING

(75) Inventor: Martin Wolfgang Meyer, Birkenfeld-Gräfenhausen (DE)

(73) Assignee: era-contact GmbH, Bretten (DE)

( * ) Notice: Subject to any disclaimer, the term of this patent is extended or adjusted under 35 U.S.C. 154(b) by 0 days.

(21) Appl. No.: 10/694,371

(22) Filed: Oct. 27, 2003

(65) Prior Publication Data

US 2004/0175076 A1 Sep. 9, 2004

(30) Foreign Application Priority Data

Mar. 7, 2003 (DE) .......................... 103 10 148

(51) Int. Cl.[7] .............................................. G02B 6/38
(52) U.S. Cl. .......................... 385/70; 385/35; 385/90
(58) Field of Search ............................. 385/70, 77, 35, 385/90

(56) References Cited

U.S. PATENT DOCUMENTS

| | | | |
|---|---|---|---|
| 4,284,311 A | 8/1981 | Forster et al. | |
| 4,807,955 A | 2/1989 | Ashman et al. | |
| 4,964,690 A | 10/1990 | Lappöhn et al. | |
| 4,997,254 A | * 3/1991 | Ganev | ........................ 385/90 |
| 5,095,517 A | * 3/1992 | Monguzzi et al. | ............ 385/90 |
| 6,481,738 B1 | 11/2002 | Duncan et al. | |

FOREIGN PATENT DOCUMENTS

| | | | |
|---|---|---|---|
| DE | 29 22 937 C2 | 7/1981 | |
| DE | 28 54 962 C2 | 9/1986 | |
| DE | 297 01 845 U1 | 4/1997 | |
| DE | 198 07 596 A1 | 9/1998 | |
| DE | 198 07 596 C2 | 11/1999 | |
| DE | 100 52 020 A1 | 5/2002 | |
| EP | 308592 A2 * | 3/1989 | ............ G02B/6/38 |
| GB | 381354 | 10/1932 | |

OTHER PUBLICATIONS

Derickson, Dennis, "Fiber Optic Test and Measurement", 1998, Prentice–Hall, Inc., Upper Saddle River, New Jersey, US 07458.

* cited by examiner

Primary Examiner—Hae Moon Hyeon
(74) Attorney, Agent, or Firm—McCormick, Paulding & Huber LLP

(57) ABSTRACT

A light conductor coupling has a first and a second coupling part which coupling parts are couplable with one another and in each of which a light conducting element is held. At least one of the light conducting elements is elastically biased so that the two light conducting elements are pressed against one another with their end surfaces when the coupling parts are coupled with one another, to allow the transmission of light from one light conducting element to the other. The end surface of the one light conducting element is spherically concave and the end surface of the other light conducting element is formed spherically convex with the same radius of curvature.

12 Claims, 6 Drawing Sheets

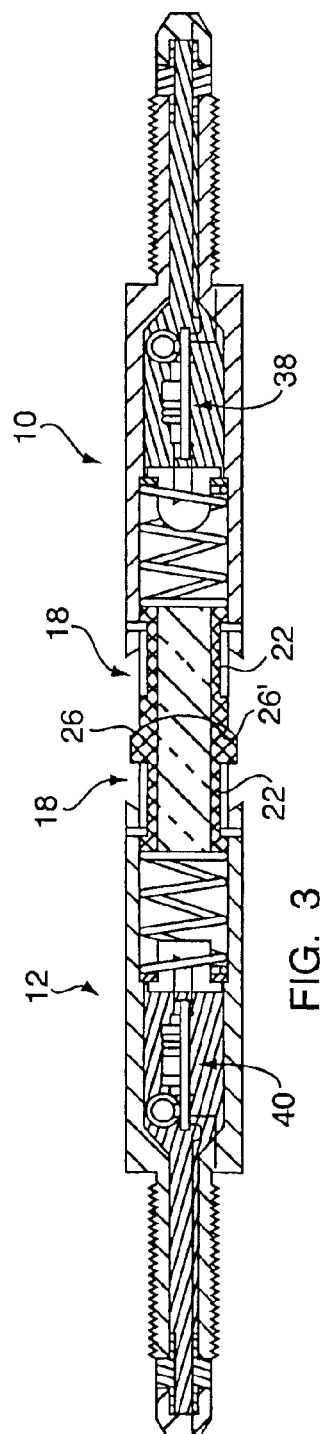
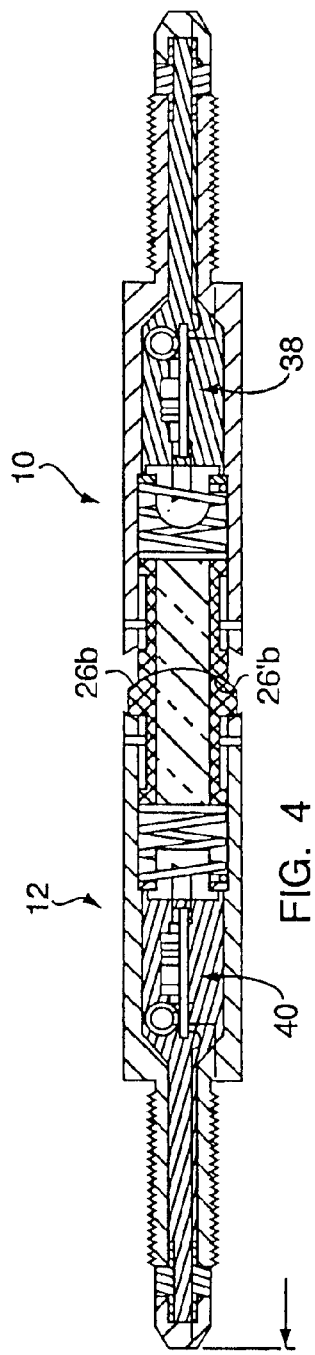
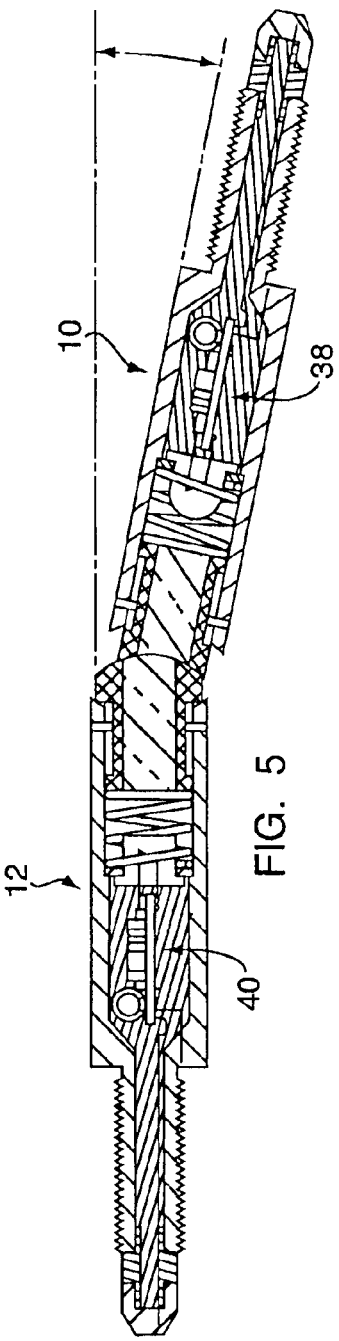

LIGHT CONDUCTOR COUPLING

CROSS-REFERENCE TO RELATED APPLICATIONS

This application is entitled to the benefit of and incorporates by reference essential subject matter disclosed in German Patent Application No. 103 10 148.9 filed on Mar. 7, 2003.

FIELD OF THE INVENTION

The present invention concerns a light conductor coupling, especially for the transmission of optical signals between vehicles a coupled with one another, with a first and a second coupling part which are couplable with one another and in each of which is contained a light conducting element, of which light conducting elements at least one is elastically biased so that the light conductor elements are pressed against one another with their end surfaces, when the coupling parts are coupled with one another, to permit a transmission of light from one light conducting element to the other.

BACKGROUND OF THE INVENTION

One such light conductor coupling is for example known from DE 28 54 962 C2, in which an intermediate buffer coupling for rail vehicles is described. A cable coupling belongs to the intermediate buffer coupling which among other things serves to transmit impulses for the control of the braking and driving currents from one vehicle to the other in a train of vehicles. The cable coupling consists of two contact carriers each of which is carried by a respective one of the vehicles and in which along with a plurality of electrical contacts a light conductor is as well arranged. Of the two light conductors at least one is elastically biased so that the two light conductors are pressed against one another with their end faces when the contact carriers upon the coupling of the vehicles are moved against one another. Through these pressed together light conductors optical signals can be transmitted from one vehicle to the other.

From DE 198 07 596 C2 a light conducting plug connector of the previously mentioned type is known in which not only one, but both light conductor elements are elastically biased.

When light conductor couplings of the above-mentioned type are used under rough conditions, such as for example for the transmission of signals between coupled vehicles, there however appear many transmission failures. A reason for this lies in that the optical signals are heavily attenuated in their transmission from one light conductor element to the other, both because of a dislocating movement as well as because of a tilting of the optical axes of the two light conductors relative to one another, which leads to a falsification of the optical signals. One such dislocating movement or such a tipping of the optical axes of the light conducting elements can however hardly be avoided in the case of vehicles which are coupled with one another, since the two coupling parts are not rigidly connected with one another and are relatively heavily mechanically stressed. Further reasons for an unreliable signal transmission lie in the sensitivity of such light conductor couplings to abrasion and contamination which in relatively rough conditions are likewise unavoidable.

To circumvent these problems an optical signal coupling is proposed in DE 29 22 937 C2 in which the light conductors are not pushed together at their end surfaces, and instead the light is transmitted with the help of lens pieces through the air from one light conductor to the other. Such a signal coupling is however relatively complicated and expensive and cannot offer the reliability which was expected of it.

In consideration of the above mentioned difficulties in DE100 52 020 A1 it has been proposed, in the case of applications under rough conditions, to do away entirely with a customary optical coupling of light conductors and instead of this to first convert the optical signals conducted in a first light conductor into electrical signals, to transmit these signals over customary electric couplings, to again convert the electrical signals into optical signals and to feed those optical signals into a second light conductor. With this solution, one loses above all the previously mentioned advantages of a light conductor coupling, namely the increased transmission bandwidth and a lower susceptibility to electromagnetic disturbing fields, especially those which always appear if in the immediate vicinity high currents are also transmitted, as for example in cable couplings for rail vehicles is often the case.

The invention has as its basic object the provision of a light conductor coupling which is of simple construction and which permits a disturbance insensitive signal transmission.

SUMMARY OF THE INVENTION

This object is solved by way of a light conductor coupling of the above-mentioned kind in that the end surface of one of the light conductor elements is spherically concave and the end surface of the other light conductor element is formed spherically convex with the same radius of curvature.

In the coupled condition the convex end surface of the one coupling part lies exactly fittingly into the convex end surface of the other coupling part, and indeed without an air gap between the end surfaces, which air gap would lead to an attenuation of the optical signals.

By the biasing of the one or both light conductor elements, the convex end surface is pressed into the hollowing of the concave end surface so that the two coupling parts are automatically centered with one another. Thereby with the light conductor coupling of the invention a mechanical displacement of the optical axes of the light conducting elements is avoided, which in the case of customary light conductor couplings likewise leads to an attenuation of the optical signals.

Moreover, the spherical end faces allow a tilting of the optical axes of the light conductor elements relative to one another without the end surfaces being lifted from one another. In the case of such a tilting the spherical convex surface slides on the spherical concave surface, like a socket joint head in a socket joint socket, without producing an air gap between the end faces. This is a great advantage in comparison to customary light conductor couplings with flat end faces between which in the case of a tilting of the coupling parts relative to one another without fail an air gap is formed, which leads to a non-permissible attenuation of the transmitted signal.

The possibility of a small attenuation as a result of a tilting of the coupling parts relative to one another is especially of great significance if the light conductor coupling is used to transmit optical signals between coupled vehicles, such as rail vehicles. Although in the case of customary light conductor couplings for rail vehicles it is attempted to guide the coupling parts of signal couplings and electric couplings linearly, that is to prevent a tilting of the coupling parts relative to one another, this is not achieved reliably in practice because of the high mechanical loads, which leads to an excessive attenuation of the transmitted optical signals. With the described improved light conductor coupling a linear guiding can be entirely forgone as a matter of principle, because even a relatively large tilting of the coupling parts relative to one another leads to a tolerable attenuation of the signals. The improved light conductor coupling is therefore to a given degree "bendable."

Preferably, the light conducting elements each include a light opaque sleeve and a transparent core received in the sleeve. When the coupling parts are coupled, the light opaque sleeves form a light tunnel shielded from daylight.

The spherical end surfaces of the transparent cores are each smoothly continued into the ends of the respectively associated sleeves. Thereby even in the case of a tilting of the light conducting elements relative to one another no daylight can fall into the transparent core, assuming that the wall thicknesses' of the sleeves in the region of the end faces are not too small. Preferably these wall thicknesses' have values which are at least $\frac{1}{10}$ and preferably at least $\frac{1}{5}$ of the radius of curvature of the end surfaces.

The previously described light conductor coupling can be used in customary ways and with the described advantages as a passive-coupling element between two light conductors. For example, an optical signal can be conducted through a first light conductor over a given stretch of distance to the first coupling part and can there be supplied to the light conductor element of the first coupling part. That optical signal is then transmitted through the end surfaces of the two light conducting elements to the light conducting element of the second coupling part, from which it is then fed into a second light conductor and by that conducted over a further stretch of distance.

Because of its simple construction and its reliable coupling properties the described light conductor coupling is however also suitable for a broader and more multifaceted use. A larger multifaceted capability is achieved if the light conductor coupling is equipped with active elements for signal processing or for the creation of new signals.

In a preferred further development the first coupling part therefore includes a sending device which creates optical signals from electric signals and feeds the optical signals into the light conductor element of the first coupling part. Additionally or alternatively the second coupling part includes a receiving device which creates electric signals from the optical signals transmitted to the light conductor element of the second coupling part.

Moreover, the first coupling part can include a microprocessor which prepares the electric signals for the sending device. Also the second coupling part can include a microprocessor which processes the electric signals created in the receiving device. With this processing in the microprocessor of the second coupling part a test for example can be made as to whether the signals have been entirely transmitted. In the event this is not the case, the microprocessor of the first coupling part can be commanded to send the signals again. The microprocessor of the first coupling part can for example prescribe to the sending device the strength of the optical signals to be created by it so as to compensate for a possible attenuation of the optical signal transmission as a result of dirtying or moistening of the end faces of the light conductor elements.

In a preferred further development the microprocessor of the first coupling part is programmed to merge several individual signals into electrically multiplexed signals and the microprocessor of the second coupling part is programmed to divide the electric multiplexed signals into individual signals. Then several individual signals can be transmitted through the light conductor coupling at the same time, so that further light conductor couplings can be spared.

Preferably, the first and/or the second coupling part has a housing on an axial end of which a sleeve-like section is formed in which the light conductor element is axially slidably supported and is elastically biased in the direction toward that one axial end, and in the other end of which a connecting pin is formed which is intended for insertion into a contact carrier. The connecting pin preferably consists of two sections insulated from one another, of which sections one is connected to ground potential and the other connected to an electric signal conductor, when the contact pin is inserted into the contact carrier.

BRIEF DESCRIPTION OF THE DRAWINGS

Further features and advantages of the invention will be apparent from the following description in which the light conductor coupling is explained in more detail by way of an exemplary embodiment. The drawings are:

FIG. 3 is a sectional view of the coupling parts of FIGS. 1 and 2 in coupled condition, FIG. 4 shows the coupled coupling parts of FIG. 3, the spacing of which in the direction of the optical axis has been shortened, FIG. 5 shows the coupled coupling parts of FIG. 3, the optical axes of which have been tilted relative to one another.

DETAILED DESCRIPTION OF THE PREFERRED EMBODIMENTS

Figure 1:
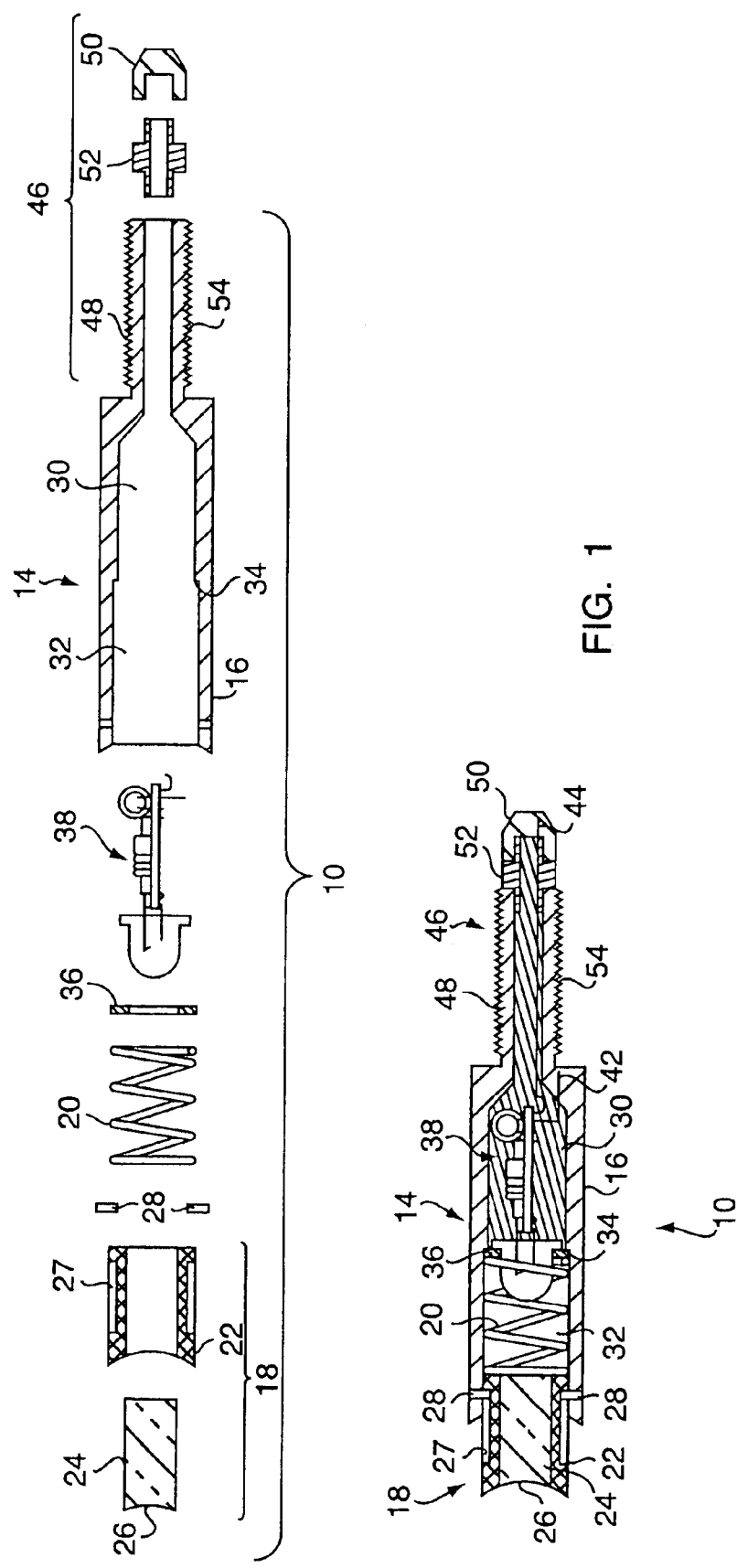
FIG. 1 is a sectional view of a first coupling part of a light conductor coupling in exploded illustration (upper) and in assembled condition (lower)
Figure 2:
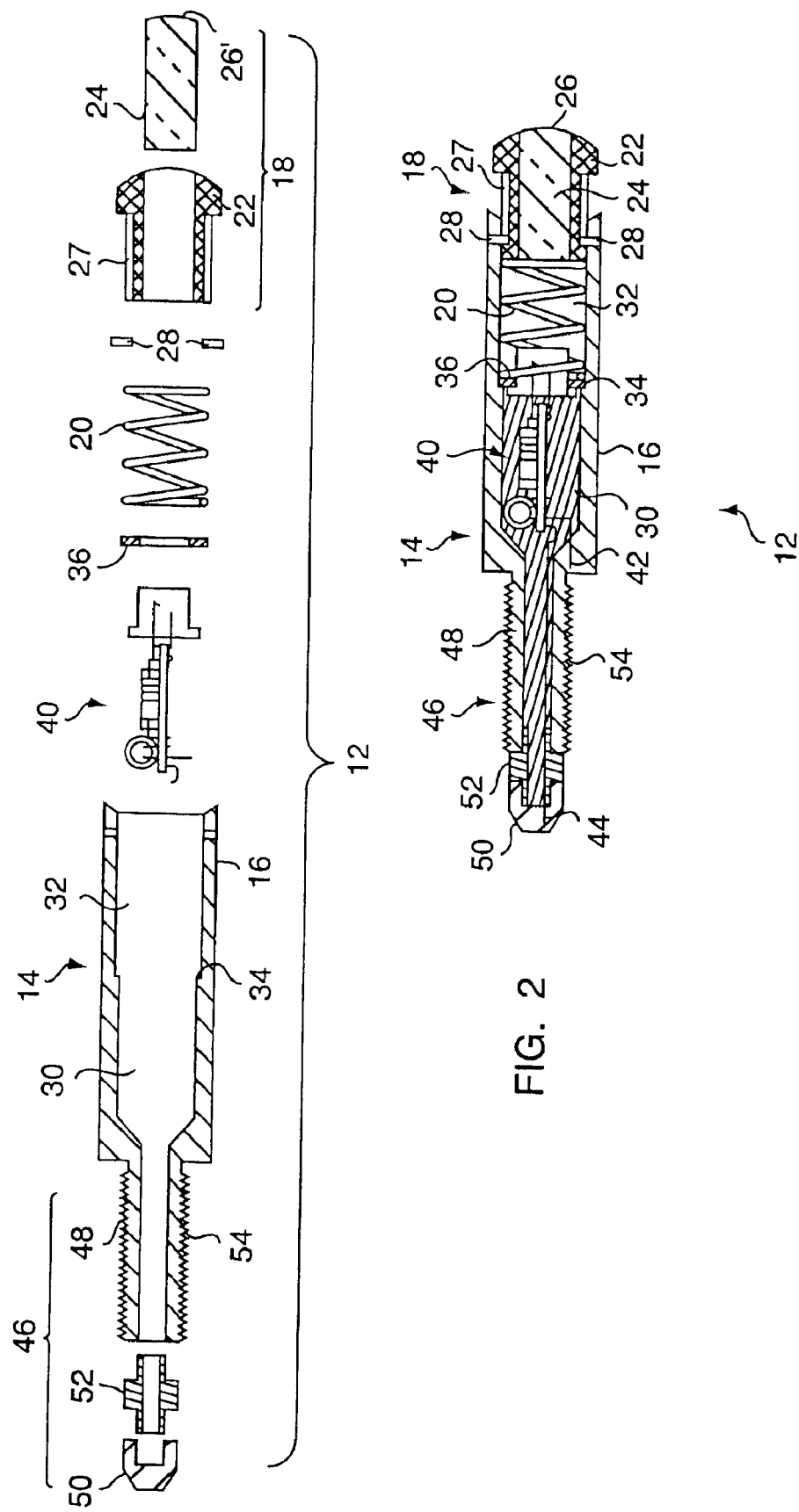
FIG. 2 is a sectional view of a second coupling part of a light conductor coupling in exploded illustration (upper) and in assembled condition (lower)

Shown in FIG. 1 is a longitudinal sectional view of the first coupling part 10 of a light conductor coupling according to a development of the present invention in exploded illustration (upper) and in assembled condition (lower). In FIG. 2 is shown a longitudinal sectional illustration of the second coupling part 12 of the same light conductor coupling in exploded illustration (upper) and in assembled condition (lower). Since the first and the second coupling parts 10 and 12 are identical in many features, they will be described in common in the following with similar parts being indicated by the same reference characters.

The coupling parts 10 and 12 each have a metal housing 14 with a sleeve-like section 16 in which a light conducting element 18 is axially slidably supported. The light conducting element 18 can be pressed into the sleeve-like section 16 of the associated housing 14 against the biasing force of a spring 20. In place of the spring 20, the light conducting element 18 can also be pneumatically biased by a gas captured in the sleeve-like section 16. Each light conducting element 18 includes a light opaque sleeve 22 and a transparent core 24 received in the sleeve 22.

The light conducting element 18 of the first coupling part has a spherically concave end surface 26 facing away from the sleeve-like housing section 16 (FIG. 1), and the light conducting element 18 of the second coupling part 12 has a spherically convex end surface 26' (FIG. 2), the radius of curvature of which corresponds to that of the spherically concave end surface 26. The spherically concave end surface 26 and the spherically convex end surface 26' are formed not only in the transparent core 24 but are also continued in the axial ends of the associated sleeves 22 of the light conducting elements 18.

Guide grooves 27 are formed in the sleeves 22, which guide grooves receive guide pins 28. The shifting movement of the light conducting element 18 is thereby limited by one of the ends of the guide groove 27 engaging a guide pin 28.

The inner space of the sleeve-like housing section 16 is made up of two cylindrical sections, one being an inwardly lying section 30 and the other being a more outwardly lying section 32, the diameter of which is larger than that of the inwardly lying section 30. Between the cylindrical sections 30 and 32 is a shoulder 34 formed in the housing inner wall. In the outwardly lying section 32 are located the light conducting element 18 and the spring 20, which spring at one end engages the light conducting element 18 and with its other end engages a metal ring 36 which in turn lies on the shoulder 34.

In the inwardly lying section 30 in the case of the first coupling part 10 is a sending device 38 (FIG. 1) and in the case of the second coupling part is a receiving device 40 (FIG. 2). Each of the sending device 38 and the receiving device 40 has a ground connection 42 which is soldered to the sleeve-like section 16 of the housing 14, and each has a signal terminal 44.

The housing 14 has at its end facing away from the light conducting element 18 a hollow connecting pin 46 with a ground connector section 48, a signal connector section 50, and lying between them an insulating piece 52 which electrically isolates the sections 48 and 50 from one another. The signal terminal 44 is guided through the hollow space of the connector pin 46 and is soldered with the signal connector section 50. The inwardly lying section 30 and the hollow space of the connector pin 46 are filled with pottant material illustrated in FIGS. 1 and 2 by cross hatching.

Figure 6:
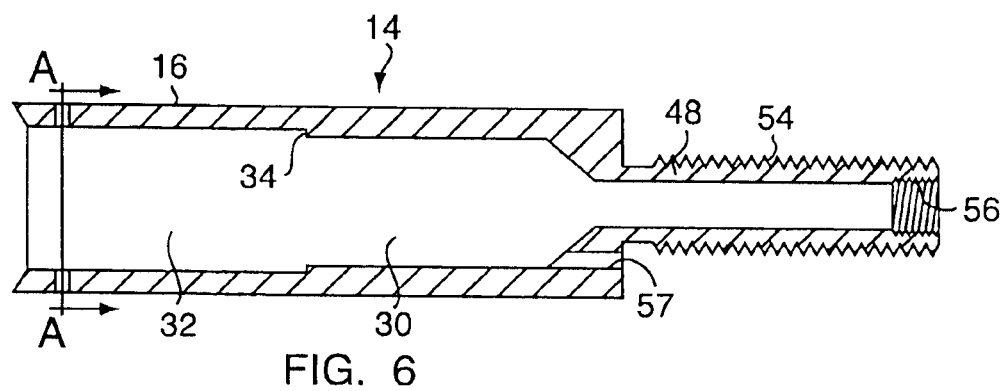
FIG. 6 is a longitudinal section through the housing of the first coupling part.

FIG. 6 shows an enlarged cross sectional view of the housing 14 of the first coupling part 10. As is to be seen in FIG. 6 the ground connector section 48 of the connecting pin 46 has an external thread 54 formed on it, by means of which the first coupling part 10 is threadable into a socket at ground potential of a contact carrier. On the inner side of the ground connector section 48 is an internal thread 56 into which the insulating piece 52 is threadable (see FIG. 1). In the sectional illustration of FIG. 6 is further shown a bore 57 into which the ground connector section 48 of the sending device 38 is soldered.

Figure 8:
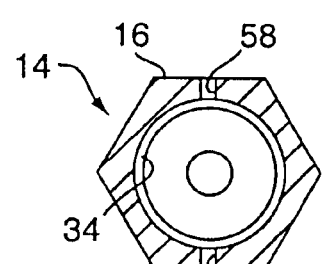
FIG. 8 is a cross sectional view of an alternative embodiment of the housing of the first coupling part.

FIG. 8 shows a cross section through the housing 14 of the first coupling part 10 taken along the line A—A of FIG. 6.

Figure 7:
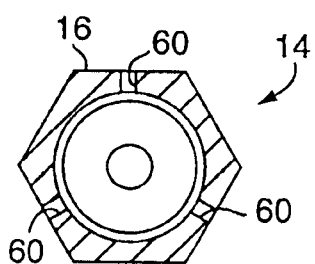
FIG. 7 is a cross sectional view of the housing of the first coupling part.

As is to be seen, the sleeve like section 16 of the housing 14 has a hexagonal external cross section to which a work tool is applyable to screw the coupling part 10 by way of its thread 54 into a socket. The sleeve like section 16 of the housing 14 has two recesses of 58 for the guide pins 28, which have already been described in connection with FIGS. 1 and 2. In place of two recesses 58, three recesses 60 can be provided which are displaced from one another by 120°, as is shown in FIG. 7. In this case the light opaque sleeve 22 has three correspondingly arranged guide grooves 27.

In FIG. 3 the first coupling part 10 and the second coupling part 12 are shown in coupled condition. In this condition, the end faces 26 and 26' of the associated light conductor elements 18 are pressed onto one another so that the optical signals which are fed into the transparent core 24 of the light conducting element 18 of the first coupling part 10 are transmitted through the end faces 26 and 26' into the transparent core 24 of the light conducting element 18 of the second coupling part 12. Thereby the light opaque sleeves 22 of the light conducting elements 18 form a light tunnel shielded from daylight.

Since the two light conducting elements 18 are each slidable in the housing of 14 of the associated coupling part 10 or 12 the coupling parts can be moved somewhat away from and toward one another without disturbing the functioning of the signal coupling. In FIG. 4, for example, the coupling parts 10 and 12 of FIG. 3 have been moved somewhat toward one another without that having changed the positions of the light conducting elements 18 to one another, so that the light transmission remains undisturbed. The illustrated light conductor coupling therefore allows a certain tolerance in the relative arrangement of the two coupling parts 10 and 12 in the coupling direction, that is along the optical axes of the light conducting elements 18, which optical axes are formed by the middle axes of the light conducting elements 18. Further, the spring pressure biased end faces 26 and 26' prevent displacement of the optical axes of the light conducting elements 18 against one another, that is they help to orient the coupling parts to one another and to maintain the oriented positions.

In FIG. 5, the two coupling parts 10 and 12 are likewise shown in coupled condition. Differently than in FIGS. 3 and 4, in this case the coupling parts 10 and 12 are not aligned with each other, but instead are tilted relative to one another. That means that the optical axes of the light conducting elements 18, each of which coincides with the symmetry axis of the associated transparent core 24, stand at an angle to one another. Because of their spherical shape, the end surfaces 26 and 26' nevertheless lie without gap on one another, so that the attenuation of the light upon passage through the end surfaces 26 and 26' is held within limit. The light conducting coupling is therefore bendable to a certain degree, without such bending influencing its function. This is a large advantage in comparison to customarily used flat end faces which upon such a bending become lifted from one another so that the light transmission from one coupling part to the other becomes heavily attenuated.

In FIG. 5, the light conductor coupling is shown in its maximally bent condition, in which the coupling parts are bent about 11° relative to one another. In the case of a further bending daylight would enter the light tunnel and falsify the optical signal. The limiting angle at which daylight penetrates into the light tunnel depends on the relationship of the wall thicknesses of the light opaque sleeves in the region of the end faces 26 and 26' to the radius of curvature of the end faces 26 and 26'. In the illustrated example, the wall thickness of the light opaque sleeve 22 of the first coupling part 10 in the area of the end face 26 is smaller than that of the light opaque sleeve 22 of the second coupling 12, and is therefore determinative of the value of the limiting angle. It measures about ⅕ of the radius of curvature of the spherical end surfaces 26 and 26'.

It is to be emphasized, that although the light conductor coupling shown in FIGS. 1 to 5 includes a sending device 38 and a receiving device 40, the previously described features, especially the spherical formation of the end surfaces 26 and 26' are also assumed in the customary sense for light conductor couplings in which no such active elements are provided. In this case light from one light conductor is fed into the light conducting element 18 of the first coupling part 10, is transmitted through its end surface 26 and through the end surface 26' of the light conducting element 18 of the second coupling part 12 and is further conducted by a light conductor connected with the light conducting element 18 of the second coupling part. The sending and receiving devices 38 and 40 represent only an advantageous further development of the invention which is described in the following.

Figure 9:
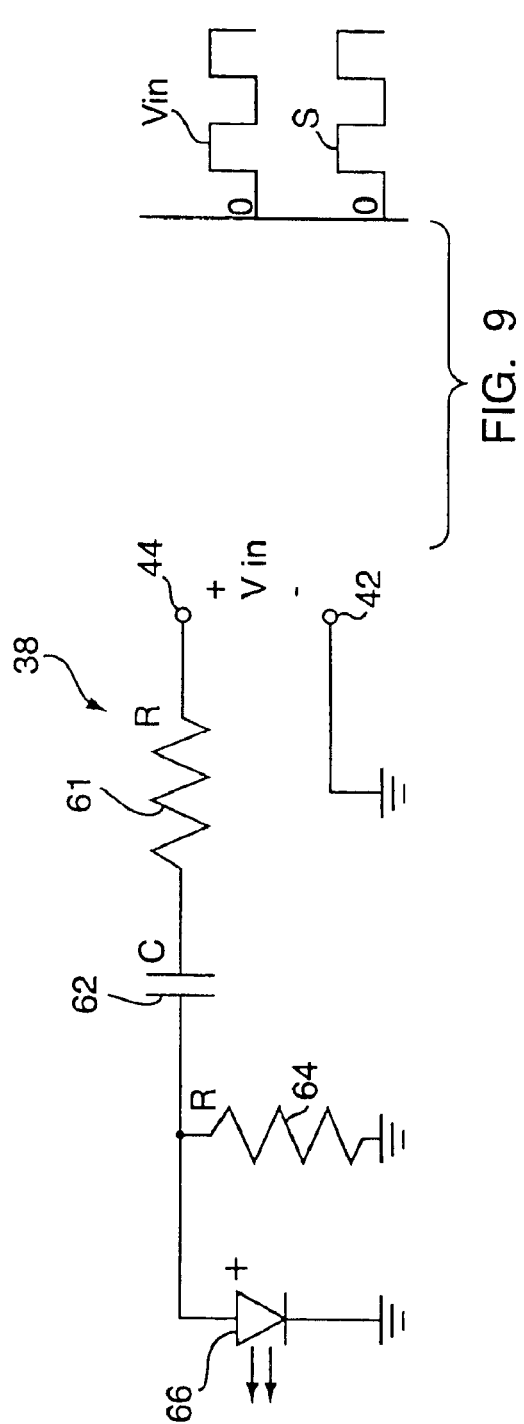
FIG. 9 is a functional sketch of a sending device of the first coupling part.

FIG. 9 shows a functional sketch of the sending device 38. As is to be taken from this, an input voltage $V_{in}$ is applied between the ground connection 42 and the signal connection 44 through a scaling resistor 64 and is applied through a high pass filter, consisting of a capacitor 62 and a resistor 64, to a light emitting diode 66, which emits light corresponding to the applied voltage. The relationship between the applied voltage $V_{in}$ and the radiated power S of the light emitting diode 66 is schematically represented in the diagram in the right portion of FIG. 9, whose abscissa indicates time and whose ordinate gives the input voltage $V_{in}$ and the radiation power S in undefined units.

Figure 10:
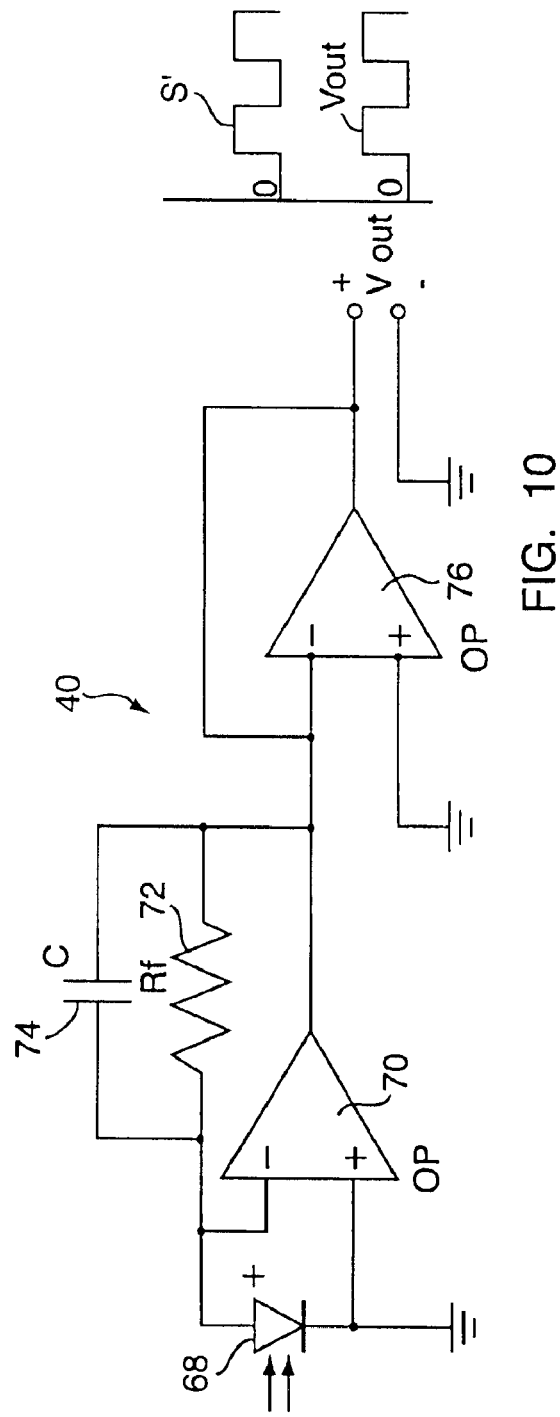
FIG. 10 is a functional sketch of a receiving device of the second coupling part.

FIG. 10 shows a functional sketch of the receiving device 40. The receiving device 40 includes a photodiode 68 which in dependence on the intensity of the incoming light produces a voltage. This voltage is suitably amplified in a first circuit section with the help of an operational amplifier 70, a resistor 72, and a capacitor 74, and is inverted with the help of a further operational amplifier 76 to an output voltage $V_{out}$. The relation between the received emission power S' (which multiplied by an attenuation factor corresponds to the radiation power emitted from the LED 66) and the output signal $V_{out}$ of the receiving device 40 is schematically illustrated in the diagram in the right portion of FIG. 10, the abscissa of which again shows time and the ordinate of which shows the received emission power S' and the output voltage $V_{out}$ in undefined units.

The sending device 38 and the receiving device 40 are so designed that the output signal $V_{out}$ of the receiving device 40 despite a possible attenuation of the transmitted optical signal corresponds to the input voltage $V_{in}$. Therefore, even if the optical signal transmitted between the coupling parts 10 and 12 is subjected to a certain attenuation, the effective transmitted electric signal $V_{out}$ is not attenuated in respect to the original signal $V_{in}$.

The electric input signal $V_{in}$, can for example be an electrical high frequency signal which inside of two vehicles is conducted through a co-axial cable and only to suit the signal coupling is converted into an optical signal with the help of the sending device 38. The light conductor coupling with the active elements 38 and 40, however, finds for example other uses if in the vehicle optical signals are already transmitted through light conductors. These signals are then in the first coupling part 10 first converted to an electric signal which is then applied to the sending device 38. The output signal $V_{out}$ of the receiving device 40 is then in the second coupling part again converted into an optical signal and supplied to a subsequent light conductor.

Figure 11:
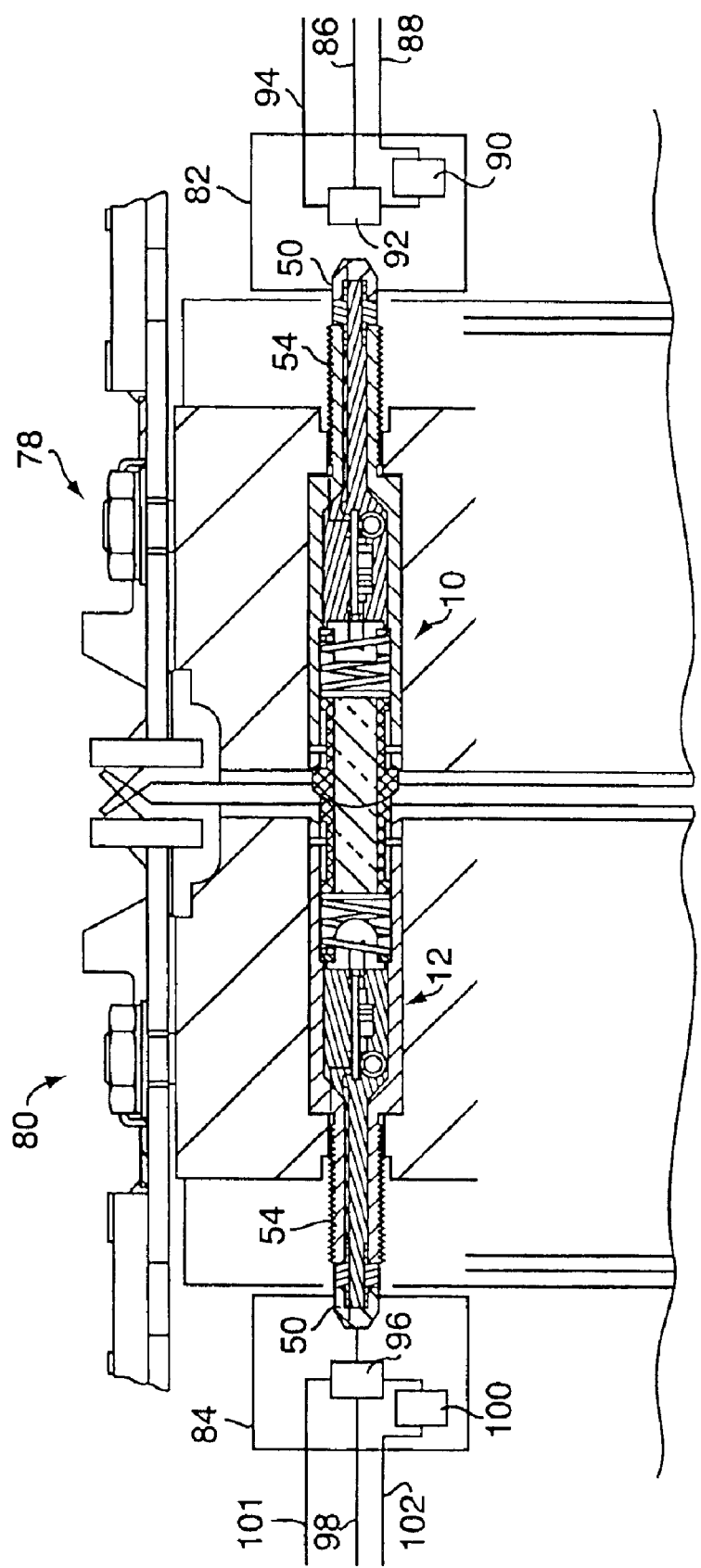
FIG. 11 is a sectional view of a portion of a light conductor coupling for rail vehicles with two contact carriers, in each of which a coupling part of the light conductor coupling is used.

FIG. 11 shows in sectional illustration a section of a conductor coupling for use in combination with an automatic rail vehicle coupling. An automatic coupling is used if the towed members have to be often coupled and de-coupled. Then the associated conductor coupling is so designed that its electrical and optical contacts are likewise automatically coupled along with the automatic coupling of the towed members.

The conductor coupling includes two contact carriers 78 and 80 in which, along with a row of electrical contacts (not shown), the above-described coupling parts 10 and 12 of the light conductor coupling are also used. The coupling parts at 10 and 12 are forwardly threaded into the contact carriers 78 and 80 by means of the thread 54 of the connector pins 46, whereby the thread 54 is subjected to ground potential. At the same time, the signal contact section 50 of the first coupling part 10 comes into electrical contact with a schematically illustrated first signal processing unit 82 and the signal connector section 50 of the second coupling part 12 comes into electric contact with a schematically illustrated second signal processing unit 84.

In the illustrated exemplary embodiment the first signal-processing unit 82 is supplied with electric signals over a co-axial cable 86 and optical signals over a light conductor 88. The optical signals of the light conductor 88 are converted into electrical signals in a converter unit 90 and together with the electrical signals of the electrical conductor 86 are delivered to a control unit 92. In the control unit 92 the two inputted electrical signals are processed into a multiplexed signal which is transmitted to the signal connector 50 of the first coupling part. For this the control unit 92 has a microprocessor, (not shown), which is constituted by an industrial PC or a so-called field programmable gate array (FPGA).

The control unit 92 further has a data input 94 through which further information for the signal processing can be delivered. For example, through the data conductor 94, it can be signaled that already transmitted signals have not been completely received and should be sent again.

The conversion of the electric multiplexed signals into optical signals by the sending device 38 and their transmission from the first coupling part 10 to the second coupling part 12 takes place in the way described above. From the signal connector 50 of the second coupling part 12, the electrical signals created in the receiving device 40 reach a control unit 96 of the second signal-processing unit 84. In the control unit 96 the multiplexed signals are divided into individual signals. The original ingoing signals from the electric conductor 86 are further conducted by an electrical conductor 98. The original ingoing signals from the light conductor 88 are converted again into optical signals in a converter unit 100 and are supplied to a light conductor 102.

By means of a further data conductor 104 signals from the control unit 96 can be further conducted, for example fault reports if signal errors have been received. The control unit 96 contains likewise an industrial PC or an FPGA (not shown).

The signal processing units 82 and 84 can also be contained in the housings 14 of the coupling parts. Further, the signal processing units 82 and 84 can each be connected with a transmission capable coupling part (similar to the first coupling part 10) and a receiving capable coupling part (similar to the second coupling part 12). Then, signals can be transmitted from both sides of the coupling to the other side and the signal processing units of 82 and 84 can communicate with one another in both directions.

The coupling parts 10 and 12 can above all be not only arranged in special contact carriers as shown in FIG. 11, but can also be arranged in the coupling heads of a mechanical rail vehicle coupling, for example in an automatic intermediate buffer coupling (not shown). The above described insensitivity of the optical signal coupling with respect to mechanical tolerances makes this arrangement possible, which would not function in the case of a customary optical signal coupling. Thereby in many cases a separate conductor coupling can be spared.

What is claimed is:

1. A light conductor coupling, especially for the transmission of optical signals between vehicles coupled with one another, comprising first and second coupling parts, which are couplable with one another and in each of which is held a light conducting element, of which at least one is elastically biased so that the light conducting elements are pressed against one another with their end surfaces, when the coupling parts are coupled with one another, in order to allow the transmission of light from one light conducting element to the other light conducting element, wherein the end surface of one light conducting element is spherically concave and the end surface of the other light conducting element is formed spherically convex with the same radius of curvature.

2. A light conductor coupling according to claim 1, wherein the light conducting elements are each made of a light opaque sleeve and a transparent core received in the sleeve.

3. A light conductor coupling according to claim 2, wherein the wall thicknesses of the sleeves in the region of the end surfaces each have a value which is at least 1/10, preferably at least 1/5, of the radius of curvature of the end surfaces.

4. A light conductor coupling according to claim 1, wherein the first coupling part includes a sending device which creates the optical signals from electric signals and feeds the optical signals into the light conducting element of the first coupling part.

5. A light conductor coupling according to claim 4, wherein the sending device has at least one LED for the creation of the optical signals.

6. A light conductor coupling according to claim 4, wherein the first coupling part includes a microprocessor which prepares the electric signals for the sending device.

7. A light conductor coupling according to claim 1, wherein the second coupling part includes a receiving device which creates electric signals from the optical signals transmitted to the light conducting element of the second coupling part.

8. A light conductor coupling according to claim 7, wherein the receiving device has a photodiode for the detection of the optical signals.

9. A light conductor coupling according to claim 7, wherein the second coupling part includes a microprocessor which processes the electric signals created in the receiving device.

10. A light conductor coupling according to claim 6, wherein the microprocessor of the first coupling part is programmed to merge several individual signals into electrically multiplexed signals, and wherein the second coupling part includes a receiving device which creates electric signals from the optical signals transmitted to the light conducting element of the second coupling part and the second coupling part includes a microprocessor which processes the electric signals created in the receiving device, the microprocessor of the second coupling part being programmed to separate the electric multiplexed signals into individual signals.

11. A light conductor coupling according to claim 4, wherein the first and/or second coupling part has a housing on one axial end of which a sleeve-like section is formed in which the light conducting element is axially slidably supported and is biased in the direction of that one axial end, and on the other end of which a connecting pin is formed and is designed for insertion into a contact carrier.

12. A light conductor coupling according to claim 11, wherein the connecting pin has two sections of insulated from one another, of which sections one is connected with ground potential and the other is connected with an electric signal conductor when the connecting pin is inserted into the contact carrier.

* * * * *